United States Patent
Mitra et al.

(10) Patent No.: US 9,900,972 B2
(45) Date of Patent: Feb. 20, 2018

(54) PLASMA ARC CUTTING SYSTEMS, CONSUMABLES AND OPERATIONAL METHODS

(71) Applicant: Hypertherm, Inc., Hanover, NH (US)

(72) Inventors: Soumya Mitra, Lebanon, NH (US); Adam Chevalier, Orford, NH (US); Stephen M. Liebold, Grantham, NH (US); Ross A. Smith, Hanover, NH (US); Nicholas A. Sanders, Enfield, NH (US)

(73) Assignee: Hypertherm, Inc., Hanover, NH (US)

( * ) Notice: Subject to any disclaimer, the term of this patent is extended or adjusted under 35 U.S.C. 154(b) by 0 days.

(21) Appl. No.: 15/228,702

(22) Filed: Aug. 4, 2016

(65) Prior Publication Data

US 2017/0042016 A1  Feb. 9, 2017

Related U.S. Application Data

(60) Provisional application No. 62/347,856, filed on Jun. 9, 2016, provisional application No. 62/320,935, filed
(Continued)

(51) Int. Cl.
| | |
|---|---|
| *B23K 10/00* | (2006.01) |
| *H05H 1/42* | (2006.01) |
| *H05H 1/34* | (2006.01) |

(52) U.S. Cl.
CPC ........... *H05H 1/42* (2013.01); *B23K 10/00* (2013.01); *H05H 1/34* (2013.01); *H05H 2001/3457* (2013.01); *H05H 2001/3468* (2013.01)

(58) Field of Classification Search
CPC .. H05H 1/42; H05H 1/34; H05H 1/28; H05H 2001/3457; B23K 10/00; B23K 10/02
(Continued)

(56) References Cited

U.S. PATENT DOCUMENTS

| | | | |
|---|---|---|---|
| 4,311,897 A * | 1/1982 | Yerushalmy | ............ H05H 1/28 219/121.39 |
| 4,519,835 A | 5/1985 | Gauvin et al. | |

(Continued)

FOREIGN PATENT DOCUMENTS

| | | |
|---|---|---|
| EP | 0875329 A1 | 11/1998 |
| EP | 1117279 A1 | 7/2001 |

(Continued)

OTHER PUBLICATIONS

Centricut catalog "2013-2014 Plasma torches and consumables", 68 pages.
(Continued)

*Primary Examiner* — Mark Paschall
(74) *Attorney, Agent, or Firm* — Proskauer Rose LLP (57) ABSTRACT

The invention features methods and apparatuses for regulating a shielding liquid in a plasma torch. A liquid-injection shield for a plasma torch includes a body having an exterior surface and an interior surface and a liquid injection regulation component circumferentially disposed within and in direct contact with the interior surface of the body. The liquid injection regulation component and the interior surface of the body define a chamber. The liquid injection regulation component also defines a first set of ports sized to regulate a liquid entering the chamber and a second set of ports oriented to distribute a fluid exiting the chamber.

21 Claims, 6 Drawing Sheets

Related U.S. Application Data on Apr. 11, 2016, provisional application No. 62/209,913, filed on Aug. 4, 2015, provisional application No. 62/314,097, filed on Mar. 28, 2016.

(58) Field of Classification Search
USPC ........ 219/121.48, 121.5, 121.51, 75, 121.52; 313/231.51
See application file for complete search history.

(56) References Cited

U.S. PATENT DOCUMENTS

| | | | |
|---|---|---|---|
| 4,748,312 A | 5/1988 | Hatch et al. | |
| 4,914,271 A | 4/1990 | Delzenne et al. | |
| 5,023,425 A * | 6/1991 | Severance, Jr. | H05H 1/34 219/119 |
| 5,170,033 A | 12/1992 | Couch, Jr. et al. | |
| 5,317,126 A | 5/1994 | Couch, Jr. et al. | |
| 5,393,952 A | 2/1995 | Yamaguchi et al. | |
| 5,409,164 A | 4/1995 | Delzenne et al. | |
| 5,440,477 A | 5/1995 | Rohrberg et al. | |
| 5,695,662 A * | 12/1997 | Couch, Jr. | B23K 10/006 219/121.39 |
| 5,717,187 A | 2/1998 | Rogozinski et al. | |
| 5,747,767 A | 5/1998 | Severance et al. | |
| 5,796,067 A | 8/1998 | Enyedy et al. | |
| 5,874,707 A | 2/1999 | Iida et al. | |
| 5,886,315 A | 3/1999 | Lu et al. | |
| 5,994,663 A * | 11/1999 | Lu | H05H 1/34 219/121.48 |
| 6,156,995 A * | 12/2000 | Severance, Jr. | H05H 1/34 219/121.5 |
| 6,320,156 B1 | 11/2001 | Yamaguchi et al. | |
| 6,337,460 B2 | 1/2002 | Kelkar et al. | |
| 6,703,581 B2 | 3/2004 | Jones et al. | |
| 6,717,096 B2 | 4/2004 | Hewett et al. | |
| 6,903,301 B2 | 6/2005 | Jones et al. | |
| 6,936,786 B2 | 8/2005 | Hewett et al. | |
| 6,946,616 B2 | 9/2005 | Kinerson et al. | |
| 6,989,505 B2 | 1/2006 | MacKenzie et al. | |
| 7,030,337 B2 | 4/2006 | Baker et al. | |
| 7,375,302 B2 | 5/2008 | Twarog et al. | |
| 7,411,149 B2 | 8/2008 | Schneider | |
| 7,423,235 B2 | 9/2008 | Severance, Jr. | |
| 7,598,473 B2 * | 10/2009 | Cook | B23K 10/00 219/121.5 |
| 7,671,294 B2 | 3/2010 | Belashchenko et al. | |
| 7,759,599 B2 | 7/2010 | Hawley et al. | |
| 8,089,025 B2 | 1/2012 | Sanders | |
| 8,389,887 B2 | 3/2013 | Liebold et al. | |
| 8,395,076 B2 | 3/2013 | Matus | |
| 8,395,077 B2 | 3/2013 | Duan et al. | |
| 8,546,719 B2 * | 10/2013 | Warren, Jr. | B23K 10/00 219/121.37 |
| 8,575,510 B2 | 11/2013 | Laurish et al. | |
| 8,581,139 B2 | 11/2013 | Severance, Jr. | |
| 8,624,150 B2 | 1/2014 | Simek et al. | |
| 8,921,731 B2 | 12/2014 | Krink et al. | |
| 9,398,679 B2 * | 7/2016 | Namburu | H05H 1/34 |
| 2002/0117482 A1 | 8/2002 | Hewett et al. | |
| 2002/0117483 A1 | 8/2002 | Jones et al. | |
| 2002/0117484 A1 | 8/2002 | Jones et al. | |
| 2004/0195217 A1 | 10/2004 | Conway et al. | |
| 2006/0016789 A1 | 1/2006 | Mackenzie et al. | |
| 2007/0045241 A1 | 3/2007 | Schneider et al. | |
| 2008/0217305 A1 * | 9/2008 | Sanders | H05H 1/28 219/121.49 |
| 2009/0230095 A1 | 9/2009 | Liebold et al. | |
| 2009/0230097 A1 | 9/2009 | Liebold et al. | |
| 2011/0284502 A1 | 11/2011 | Krink et al. | |
| 2012/0012560 A1 * | 1/2012 | Roberts | H05H 1/34 219/74 |
| 2012/0012565 A1 | 1/2012 | Zhang et al. | |
| 2012/0246922 A1 | 10/2012 | Hussary et al. | |
| 2012/0248073 A1 | 10/2012 | Conway et al. | |
| 2012/0261392 A1 | 10/2012 | Barnett et al. | |
| 2013/0043222 A1 | 2/2013 | Leiteritz et al. | |
| 2013/0043224 A1 | 2/2013 | Leiteritz et al. | |
| 2013/0087535 A1 | 4/2013 | Barnett et al. | |
| 2014/0069895 A1 | 3/2014 | Brine et al. | |
| 2014/0113527 A1 * | 4/2014 | Lindsay | B23K 5/00 451/5 |
| 2014/0217069 A1 | 8/2014 | Griffin et al. | |
| 2014/0217070 A1 | 8/2014 | Pikus et al. | |
| 2016/0174353 A1 * | 6/2016 | Mitra | B23K 10/00 219/121.44 |

FOREIGN PATENT DOCUMENTS

| | | |
|---|---|---|
| EP | 1893004 A1 | 2/2008 |
| JP | 2011014459 A | 1/2011 |
| JP | 4688450 B2 | 5/2011 |
| JP | 4707108 B2 | 6/2011 |
| WO | 9621339 A1 | 7/1996 |
| WO | 03/089183 A1 | 10/2003 |

OTHER PUBLICATIONS

Komatsu America Industries, LLC: "Next Generation Twister TFP6062- 300A Power Supply Units", Retrieved from the internet at: http://www.komatsuplasma.com/kai/ctd/en/tfp6062/pdf/TFP6062_Brochure.pdf, printed Oct. 27, 2016, 2 pages.

Komatsu America Industries, LLC: "TFPL Twister Series", Retrieved from the internet at: http://fineplasma.com/kai/ctd/en/tfp/pdf/eTFP.pdf, printed Oct. 27, 2016, 6 pages.

Thermal Dynamics XT™-300 Brochure, May 7, 2007,http://www.mitausteel.lv/wp-content/uploads/2013/ll/V-XT300-Torch.pdf, 6 pages.

Thermal Dynamics, "XT-301 Automated Plasma Cutting Torch", retrieved from the internet at: http://victortechnologies.com/IM_Uploads/DocLib_5849_XT-301%20Torch%20for%20use%20w%20Merlin%201000%20Brochure%20(63-2524)_Nov2005.pdf: Thermadyne.

* cited by examiner

PLASMA ARC CUTTING SYSTEMS, CONSUMABLES AND OPERATIONAL METHODS

RELATED APPLICATIONS

This application claims the benefit of U.S. Provisional Patent Application No. 62/320,935, which was filed on Apr. 11, 2016 and was entitled "Consumables for Plasma Arc Torch." This application also claims the benefit of U.S. Provisional Patent Application No. 62/200,913, which was filed on Aug. 4, 2015 and was entitled "Liquid Cooled Cartridge." This application also claims the benefit of U.S. Provisional Patent Application No. 62/347,856, which was filed on Jun. 9, 2016 and was entitled "Metering Holes in the Shield Swirler." The entire contents of these applications are incorporated herein by reference.

FIELD OF THE INVENTION

The invention relates generally to the field of plasma arc cutting systems and processes. More specifically, the invention relates to improved consumable components and operational methods to achieve consistent cut quality.

BACKGROUND

Plasma arc torches are widely used in the cutting and marking of materials. A plasma torch generally includes an electrode and a nozzle having a central exit orifice mounted within a torch body, electrical connections, passages for cooling fluids (e.g., water), and passages for arc control fluids (e.g., plasma gas). The torch produces a plasma arc, a constricted ionized jet of a gas with high temperature and high momentum. Gases used in the torch can be non-reactive (e.g., argon or nitrogen) or reactive (e.g., oxygen or air). During operation, a pilot arc is first generated between the electrode (cathode) and the nozzle (anode). Generation of the pilot arc can be by means of a high frequency, high voltage signal coupled to a DC power supply and the torch or by means of any of a variety of contact starting methods.

In a fluid-injection plasma system, cut quality (e.g., the quality of angles, dross, and edge color) is sensitive to the flow rate of the shield fluid. The flow rate of shield fluid can vary for different reasons, for example as the elevation of the fluid selection console changes relative to the torch. In some cases in which water is the shield fluid, the fluid flow rate can change by up to 0.5 gallons per hour for every linear foot of elevation change. Such variation can in turn cause significant variation in cut quality. What is needed is a plasma arc cutting system that is desensitized to external pressure changes in the system (e.g., caused by elevation changes of the fluid selection console), thereby ensuring consistent cutting quality.

SUMMARY OF THE INVENTION

The present invention relates to systems and methods for establishing, in a plasma arc cutting system, improved stability in the flow rate of the shield fluid. A shield is provided with an insert (e.g., a "liquid injection regulation component") that includes two sets of ports (e.g., metering holes and swirl holes), such that a single consumable component is used both to meter and to swirl (or distribute) a shield fluid. As used in this application "swirl holes" should be understood to mean any holes that influence distribution of gas, including but not limited to by swirling the gas in the plasma torch. As set forth below, in certain embodiments the metering holes enable a constant atomized "mist" pressure to feed the swirl holes, which in turn desensitizes the plasma system to elevation changes of the fluid selection console. The result is a system that ensures reliable, repeatable cuts irrespective of the location (e.g., the elevation) of the fluid selection console relative to the torch.

For comparison purposes, a typical design for a water system in a plasma arc torch system might use a control pressure of about 5-6 psi, which could be sufficient to maintain a shield water flow rate of, for example, about 4-5 gallons per hour across different swirl hole geometries, presuming no elevation change between the pressure selection console and the torch. However, in some embodiments of the present invention, a larger fluid set pressure (e.g., 25-30 psi) can be applied in the fluid selection module (e.g., the Gas Connect module 104 shown and described below in FIG. 1), which can in turn be substantially decreased across the metering holes. In some embodiments, the pressure drop is so large that it advantageously makes the system essentially unresponsive to small pressure changes caused by elevation differences between the fluid selection console and the metering console.

In one aspect, the invention features a liquid-injection shield for a plasma torch. The shield includes a body having an exterior surface and an interior surface. The shield also includes a liquid injection regulation component circumferentially disposed within and in direct contact with the interior surface of the body. The liquid injection regulation component and the interior surface of the body define a chamber (e.g., an "atomizing" chamber). The liquid injection regulation component defines a first set of ports (e.g., "metering" holes) sized to regulate a liquid entering the chamber and defines a second set of ports (e.g., "swirl" holes) oriented to distribute a fluid exiting the chamber.

In some embodiments, the ports are oriented to impart a swirl to the fluid exiting the chamber. In some embodiments, the liquid injection regulation component comprises an insulator material. In some embodiments, each of the ports in the first set of ports is smaller than each of the ports in the second set of ports. In some embodiments, a total cross-sectional flow area of the first set of ports is less than a total cross-sectional flow area of the second set of ports. In some embodiments, the first set of ports is aligned with the chamber in the interior surface of the body. In some embodiments, the first set of ports is configured to allow a range of fluid flow rates from about 2 gallons per hour to about 8 gallons per hour. In some embodiments, the first set of ports is configured to reduce a fluid pressure by approximately 25 psi. In some embodiments, the liquid injection regulation component is molded. In some embodiments, the liquid injection regulation component is L-shaped. In some embodiments, the first set of ports is oriented at a right angle to the second set of ports. In some embodiments, the chamber is configured to atomize or create a fine mist using liquid entering the chamber. In some embodiments, the atomized mist can be a spray or collection of water particles, although a gas can be used alternatively or in addition to water. In some embodiments, the fluid exiting the chamber is a gas, water, or a water mist. In some embodiments, the liquid injection regulation component includes two separate sub-components, the first sub-component having the first set of ports and the second sub-component having the second set of ports.

In another aspect, the invention features a method of regulating a liquid injection process in a plasma arc torch shield. The method includes providing a shield having an exit orifice, an interior surface, and an exterior surface configured to be exposed to molten spatter. The method also includes supplying a liquid to the interior surface of the shield. The method also includes directing the liquid through a set of metering holes into a chamber. The metering holes induce a pressure drop of the liquid. The method also includes directing the liquid out of the chamber through a set of swirl holes toward an exit orifice.

In some embodiments, each of the holes in the set of metering holes is smaller than each of the holes in the set of swirl holes. In some embodiments, a total cross-sectional area of the set of metering holes is less than a total cross-sectional area of the set of swirl holes. In some embodiments, the metering holes are configured to allow a range of fluid flow rates from about 2 gallons per hour to about 8 gallons per hour. In some embodiments, the metering holes are configured to reduce a fluid flow pressure by approximately 25 psi. In some embodiments, the liquid is directed through the set of metering holes at a right angle to a path of the liquid through the swirl holes. In some embodiments, the chamber is configured to atomize or create a fine mist using liquid entering the chamber.

In another aspect, the invention features a shield for a plasma arc torch. The shield includes a body having an exterior surface and an interior surface, the interior surface defining a first recess. The shield also includes a fluid regulation component defining a second recess, the fluid regulation component disposed circumferentially within the interior surface of the body. The first recess of the body and the second recess of the fluid regulation component define a hollow region having entrance holes and exit holes. The entrance holes are configured to regulate a liquid entering the cavity and the exit holes are configured to impart a swirl to liquid exiting the cavity. In some embodiments, the entrance holes are oriented at a right angle to the exit holes.

BRIEF DESCRIPTION OF THE DRAWINGS

The foregoing discussion will be understood more readily from the following detailed description of the invention when taken in conjunction with the accompanying drawings.

DETAILED DESCRIPTION OF THE DRAWINGS

Figure 1:
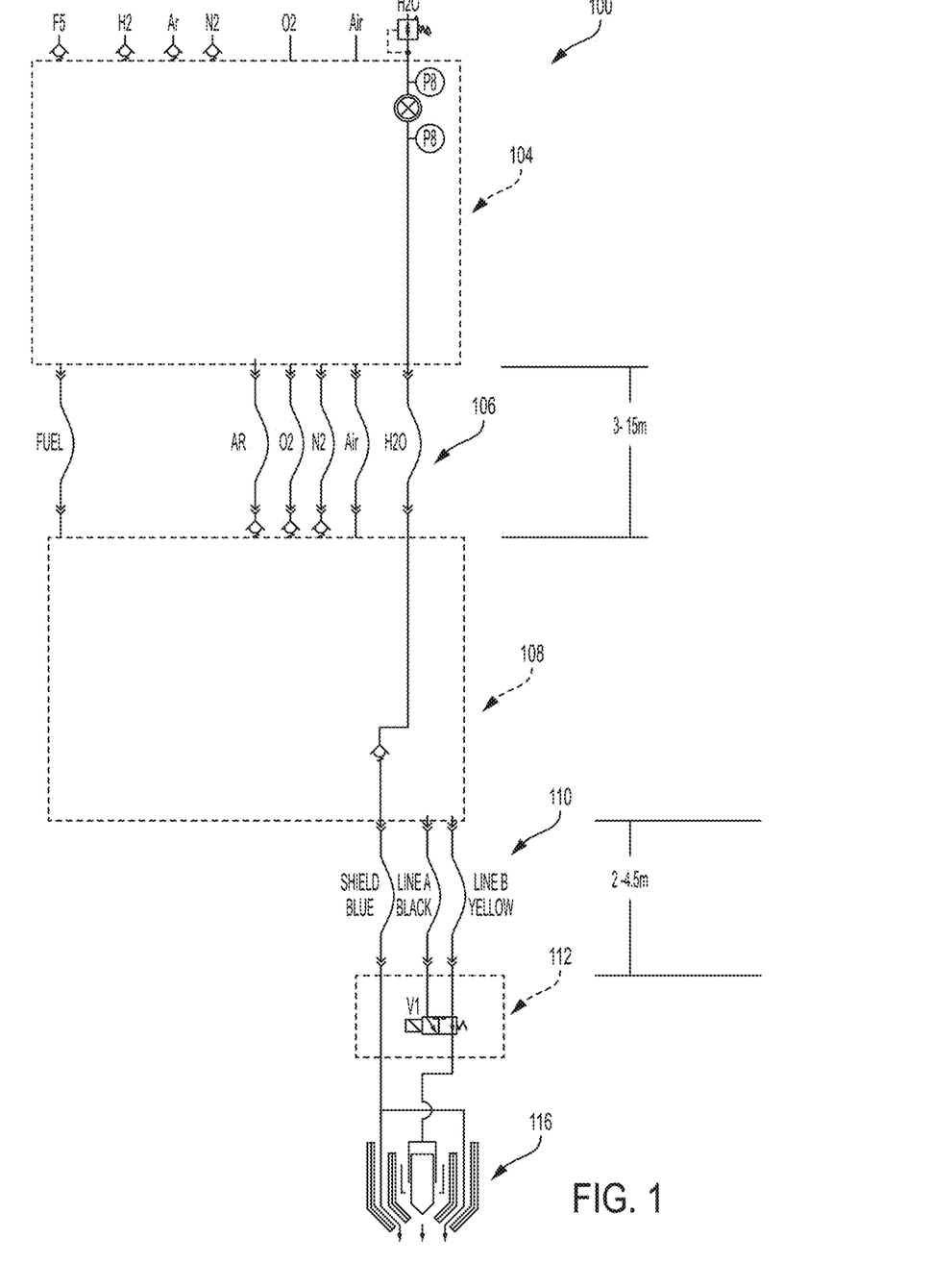
FIG. 1 is a schematic diagram of a fluid flow system for a plasma torch system, according to an illustrative embodiment of the invention.

FIG. 1 is a schematic diagram of a fluid flow system 100 for a plasma torch system, according to an illustrative embodiment of the invention. The fluid flow system 100 includes an automatic fluid selection or "Gas Connect" module 104, a "Torch Connect" module 108, a receptacle 112, and a plasma torch 116. The Gas Connect module 104 controls the fluid injection process, for example, by establishing a fluid set pressure of the system for certain gases (e.g., F5, fuel gases) and water for water injection processes. The Gas Connect module 104 also routes certain gases therethrough. The Gas Connect module 104 is connected to the Torch Connect module 108 via fluid lines 106. The Torch Connect module 108 controls the injection pressure for certain gases (e.g., $O_2$, $N_2$) and routes certain fluids (e.g., fuel gases, water) through it to the receptacle 112 and torch 116. As shown, the Gas Connect module 104 can be up to 15 meters away from the Torch Connect module 108 and up to 19.5 meters away from the receptacle 112 and torch 116. In addition, the Gas Connect module 104 can be placed at various elevations relative to the torch 116.

The Torch Connect module 108 is connected to the receptacle 112 and torch 116 via the shield lines 110. The fluid flow rate in the shield lines 110 can vary depending on the relative elevation between the torch 116 and the Gas-Connect module 104. In addition, the relative location of the Torch Connect module may introduce additional variable pressure changes based on its relative location with respect to the Gas Connect module and the torch. For example, if the torch 116 is located below the Gas Connect module 104, the flow rate of water can increase. The receptacle 112 is responsible for coupling to the torch to the lead and is connected to the torch 116 via, in some embodiments, a "quick disconnect" feature (not shown).

Figure 2A:
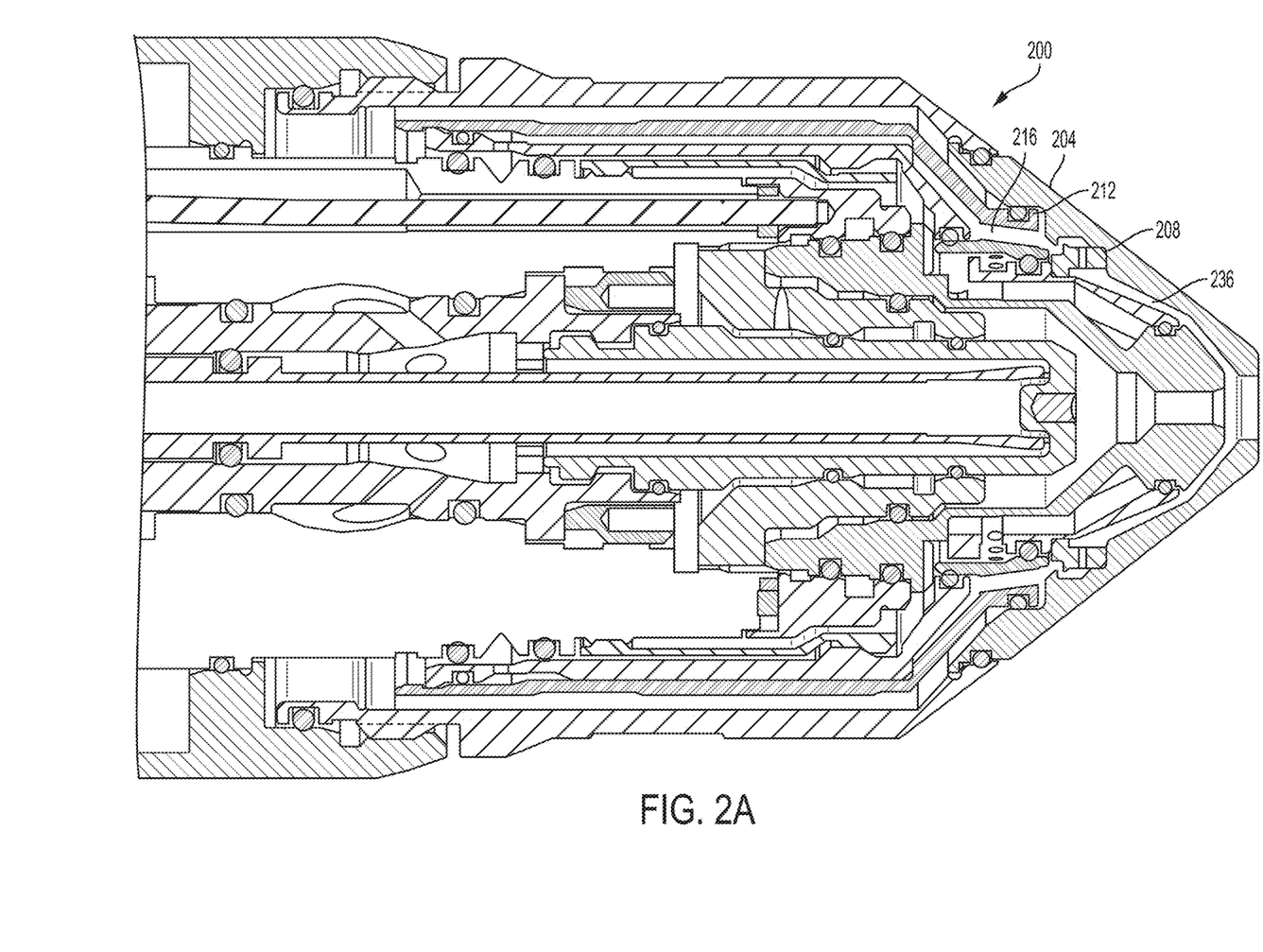
FIG. 2A is a cross-sectional illustration of a consumable stackup for a plasma torch that does not utilize metering holes in the shield insert, according to an illustrative embodiment of the invention.
Figure 2B:
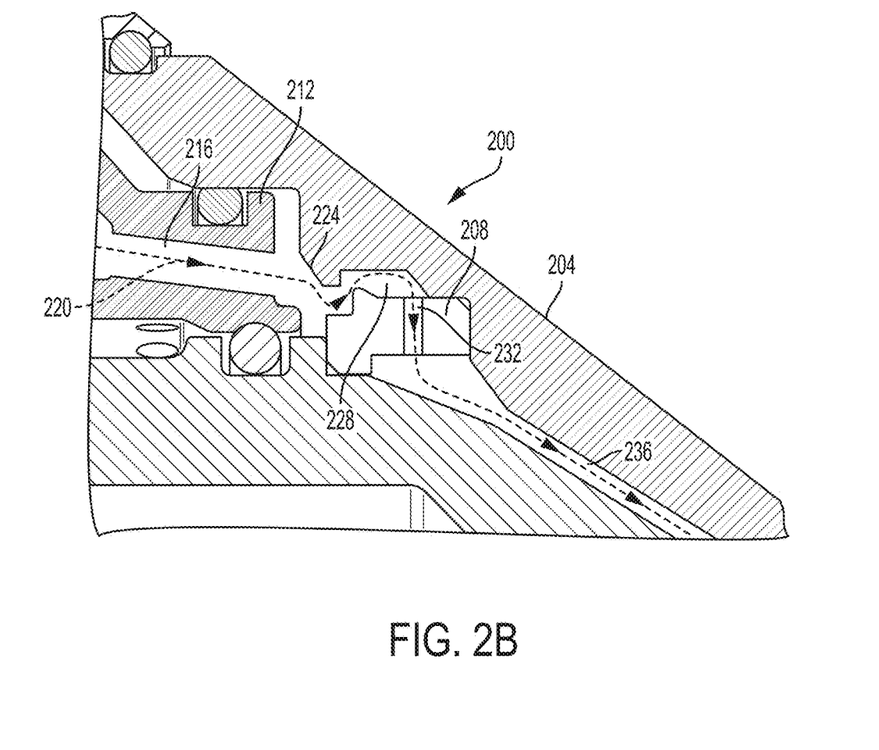
FIG. 2B is an enlarged illustration of the cross-sectional view shown in FIG. 2A, according to an illustrative embodiment of the invention.

FIG. 2A is a cross-sectional illustration of a consumable stackup 200 for a plasma torch that does not utilize metering holes in the shield insert, according to an illustrative embodiment of the invention, while FIG. 2B is an enlarged illustration of the cross-sectional view shown in FIG. 2A. FIGS. 2A and 2B are described concurrently using the same reference numerals for ease of explanation. The consumable stackup 200 includes a shield 204, a shield insert 208, and a nozzle retaining cap 212. In this consumable stackup 200, shield fluid flows through a set of ports, (e.g., port 216) in nozzle retaining cap 212 and out through a fluid passageway 236. Although only one port 216 is depicted, the nozzle retaining cap 212 includes several similar ports not visible in cross-section, and such ports are described collectively as "the ports 216". In addition, the fluid flow path 220 of shield fluid. In some embodiments, the configurations shown in FIGS. 2A-2B are used in connection with gaseous shield fluid, such as air or $N_2$.

Figure 2C:
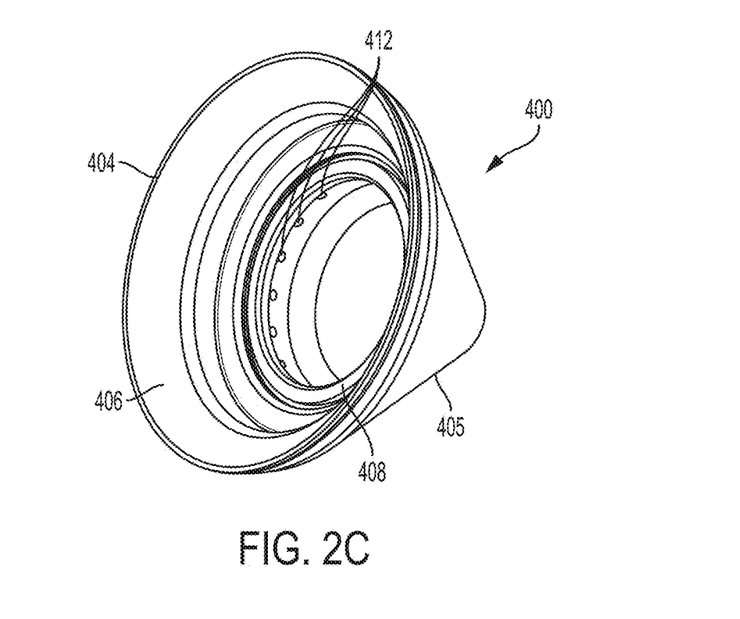
FIG. 2C is an isometric illustration of standalone shield having an insert, according to an illustrative embodiment of the invention.

As can be seen in FIG. 2B, during operation, shield fluid flows along path 220 through the ports 216. The ports 216 help to meter the shield fluid flow during operation based on, for example, their cross-sectional area. Shield fluid then impinges on a tilted or angular surface 224 on an interior of the shield 204. The tilted or angular surface 224 helps to ensure uniform pressure after the fluid exits the passage 220. The tilted or angular surface 224 also helps to capture the shield insert 208 inside the shield 204. Shield fluid then continues along path 220 into an opening or channel 228 formed between the shield 204 and the shield insert 208. As depicted, the opening or channel 228 has a sharp curvilinear shape, although in practice several shapes are possible. Fluid then flows through a set of swirl holes (e.g., the swirl hole 232) in the shield insert 208. The swirl holes 232 impart a fluid swirl pattern to the shield fluid. Shield fluid exiting the swirl holes 232 continues in fluid passageway 236 and out of the torch toward a workpiece (not shown). FIG. 2C is an isometric illustration 400 of a standalone shield 404 having an insert 408 (such as the shield 204 shown and described above in connection with FIGS. 2A-2B), according to an illustrative embodiment of the invention. FIG. 2C shows a shield 404 that is intended for use with a shield gas. The shield 404 has an exterior surface 405, an interior surface 406, and an insert 408 having a set of swirl holes 412.

In some embodiments, the consumable stackup 200 can be used in a 300A system, although similar stackups can be suitable for different systems, e.g., 170A, 130A, or 80A. If this embodiment, shown in consumable stackup 200 is used with shield fluid as water, the fluid set pressure at the Gas Connect module (e.g., Gas Connect module 104 shown and described above in FIG. 1) can achieve 1-8 gallons per hour in the range of 3-8 psi. In some embodiments, this pressure set point can be undesirably low because the nozzle retaining cap metering ports 240 are typically sized for metering gas flow and not water flow. In some embodiments, a change in pressure accompanying the change in the elevation between the control point and the torch can be comparable to the pressure setting itself. Thus, small changes in elevation can result in a dramatic change in flow rate of water through the shield, which in turn can affect cut quality (in some cases severely).

Figure 3A:
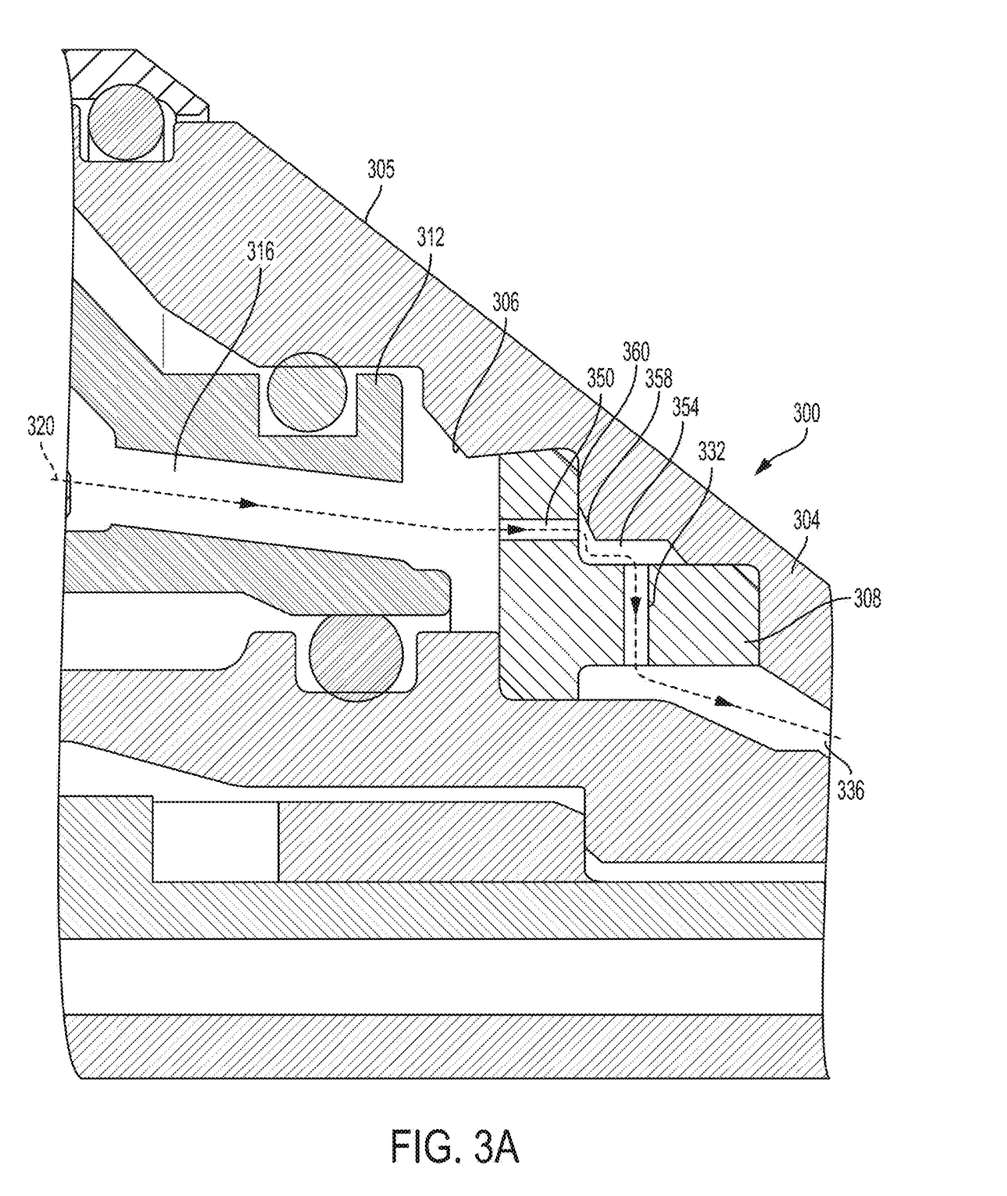
FIG. 3A is a close-up illustration of a cross-sectional view of a plasma torch that has a shield insert including metering holes and swirl holes, according to an illustrative embodiment of the invention.

FIG. 3A is a close-up illustration of a cross-sectional view of a plasma torch 300 that has a shield insert (e.g., a liquid injection regulation component) 308 including metering holes 350 and swirl holes 332, according to an illustrative embodiment of the invention. The plasma torch 300 includes a shield 304 (e.g., a "liquid-injection shield"), the shield body having an exterior surface 305 and an interior surface 306, a shield insert 308 (e.g., a "liquid injection regulation component") circumferentially disposed within and in direct contact with the interior surface 306 of the shield 304, and a nozzle retaining cap 312. This setup is similar to that shown and described above in FIGS. 2A-2B but includes several distinctions. For example, in this design, the shield 304 and the shield insert 308 define a chamber 354 for holding the atomized shield mist that enables fluid pressure stabilization. The insert's first set of ports (metering holes) 350 helps control the shield fluid flow rate within the torch 300, and the insert's second set of ports (swirl holes) 332 helps impart a swirl pattern to the shield fluid. Note that in FIG. 3A, only a single metering hole 350 and a single swirl hole 332 are visible, but the shield insert 312 typically has several metering holes and several swirl holes. As can be seen, the metering holes 350 and swirl holes 332 also serve as entrance and exit passageways, respectively, for the chamber 354.

During operation, fluid flows along fluid flow path 320 within a bore 316 in the nozzle retaining cap 312 of the torch 300 and impinges on the shield insert 350. A portion of the shield fluid impinges on the metering holes 350 and is permitted to enter the chamber 354. Fluid entering the chamber 354 impinges on the surface 358, which scatters the fluid stream and creates a fine "mist" of fluid particles (via a process of "atomization") that collect and pressurize in the chamber 354. In some embodiments, a substantial pressure drop in the shield fluid occurs across the metering holes 350 (e.g., approximately 25 psi). The fluid mist in the chamber 354 then exits the chamber 354 via the swirl holes 332 and into fluid flow path 336, which leads out of the torch 300 and onto a workpiece (not shown). The fluid exiting the swirl holes 332 can be a uniform pressure, e.g., 5-6 psi, for multiple elevation differences between the Gas Connect module 104 and the torch 116.

In some embodiments, the shield insert 308 is held in place axially by a vertical surface 360 located just above the surface 358. In some embodiments, seating on the vertical surface 360 allows a seal to form between the shield insert 308 and the shield 304, forcing the shield water through the metering hole 350 rather than allowing shield water to bypass the metering hole 350 by going between the shield insert 308 and shield 304. In some embodiments, the metering holes 350 have a total cross-sectional area that is less than that of the swirl holes 332. In some embodiments, each of the metering holes 350 is smaller than each of the swirl holes. For example, in one embodiment, there are five metering holes having a total cross-sectional area of 0.0016 square inches and 18 swirl holes having a total cross-sectional area of 0.0034 square inches. In this embodiment, the pressure drop across the metering holes can be about 18 psi. In another embodiment, there are six metering holes having a total cross-sectional area of 0.0015 square inches and 18 swirl holes having a total cross-sectional area of 0.0034 square inches. In this embodiment, the pressure drop across the metering holes can be about 20-25 psi.

In some embodiments, the swirl holes 332 are the least restrictive of the holes on fluid flow and the metering holes 350 are the most restrictive. In some cases, there is an L-shaped flange that keeps the metering holes 350 at a right angle to the swirl holes 332, as shown in FIG. 3A, creating a chamber 354 that minimizes the likelihood that fluid flows straight through the chamber 354. In some embodiments, a total volume of the chamber 354 can be about 0.00291 cubic inches (excluding the volume of the metering holes and swirl holes). In some embodiments, the shield 304 is made of a conductive material, for example copper. In some embodiments, the shield insert 308 (or "liquid injection regulation component") is made of an insulator, for example an appropriate plastic, such as PEEK or vespel. In some embodiments, the shield insert 308 is molded.

In some embodiments, pressure drops in the fluid between the Gas Connect module (e.g. Gas Connect module 104 shown and described above in reference to FIG. 1) and the torch 300 due to elevation changes is nearly a full order of magnitude smaller than the pressure drop due to the metering holes 350. Because this large pressure drop through the metering holes 350 is known and compensated for in the control pressure set point, any undesired pressure drop due to elevation changes has a minimal effect on the overall water flow rate. In some embodiments, the shield insert 308 includes two separate components (e.g., a first ring including the metering holes 350 and a second ring including the swirl holes 332). In such embodiments, it may be easier to manufacture the two separate components individually. In some embodiments, having the ability to customize two separate components may help to fine-tune flow design to a further degree of precision.

Table 1 shows the effect on flow rate of console elevation in a plasma torch system not using metering consumables. A test was conducted in which the plasma torch system was put into a "cut flow" state. In this state, no plasma is produced, but the system delivers shield and plasma fluids at the desired settings. The shield water flow rate was monitored while the Gas Connect console was moved vertically both upward and downward. As expected, holding the console above the torch elevation resulted in a higher water flow rate, and moving it below the torch elevation resulted in a lower water flow rate.

| Gas Connect Elevation Relative to Torch | Water Flow Rate |
|---|---|
| +2 feet | 5.2 gallons per hour |
| 0 feet | 4.5 gallons per hour |
| −2 feet | 3.5 gallons per hour |

Separately, the test was repeated using a shield swirler having metering holes, e.g., in accordance with the design shown and described in FIG. 3A. In this setup, no discernable change in flow was detected while shifting the Gas Connect console up and down.

Figure 3B:
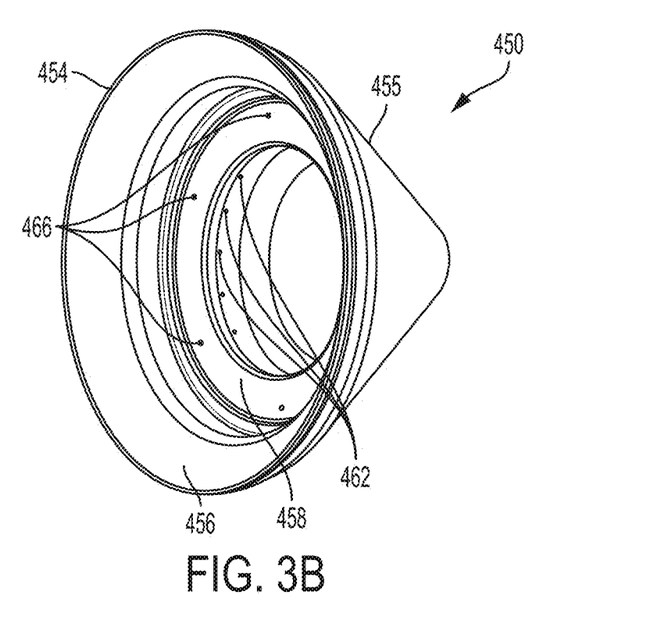
FIG. 3B is an isometric illustration of standalone shield having an insert, according to an illustrative embodiment of the invention.

FIG. 3B is an isometric illustration 450 of a standalone shield 454 having an insert 458, according to an illustrative embodiment of the invention. FIG. 3B shows a shield 454 that is intended for use with water injection processes in accordance with the principles of the current invention. The shield 454 has an exterior surface 455 and an interior surface 456, an insert 458 and a plurality of swirl holes 462. In addition, the shield 454 has a plurality of metering holes 466. A diameter of a bore in the shield 454 can be smaller for a vented water injection shield as compared with a gas shield (e.g., the shield 404). For example, in one embodiment using a 170A system in which Nitrogen gas is used as the shield, the shield bore diameter can be about 0.155 inches. In contrast, in a 170A system that uses vented water injection processes in accordance with the current invention, the shield bore diameter can be about 0.140 inches. In such an embodiment, the current density in the shield can be about 11,043 Amps per square inch, higher than the Nitrogen counterpart, which can achieve about 9,009 Amps per square inch. In addition, the swirl holes 462 for the vented water injection shield 454 can be smaller in diameter in comparison to those for the gas shield 412.

Figure 4:
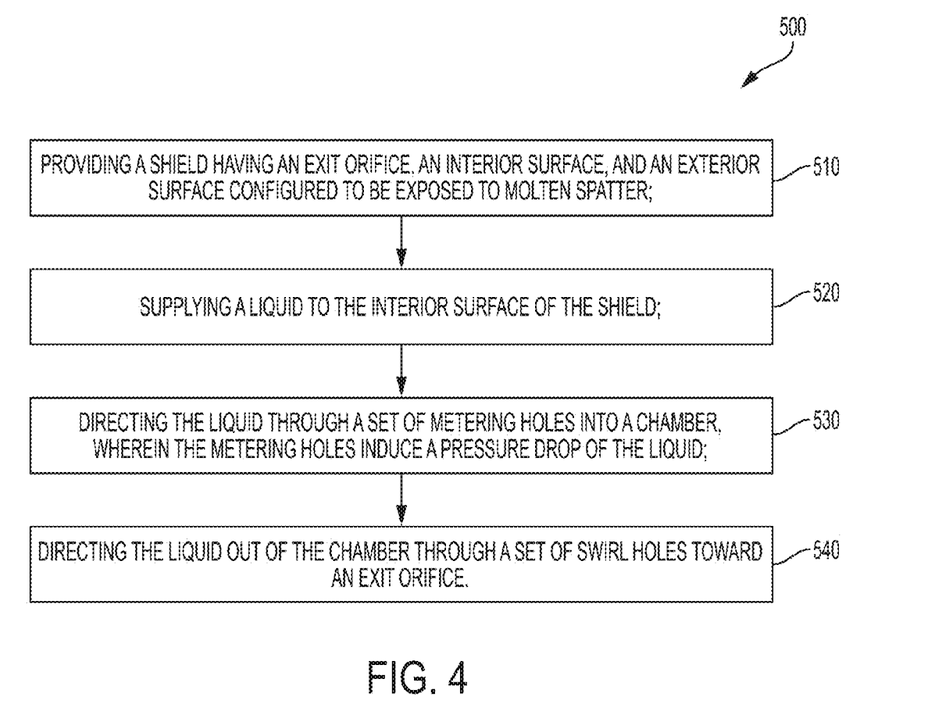
FIG. 4 is a schematic diagram of a method of regulating a liquid injection process in a plasma arc torch shield, according to an illustrative embodiment of the invention.

FIG. 4 is a schematic diagram of a method 500 of regulating a liquid injection process in a plasma arc torch shield, according to an illustrative embodiment of the invention. The method 500 includes a first step 510 of providing a shield having an exit orifice, an interior surface, and an exterior surface configured to be exposed to molten spatter. The method 500 includes a second step 520 of supplying a liquid to the interior surface of the shield. The method 500 includes a third step 530 of directing the liquid through a set of metering holes into a chamber, wherein the metering holes induce a pressure drop of the liquid. The method 500 includes a fourth step 540 of directing the liquid out of the chamber through a set of swirl holes toward an exit orifice. The method 500 allows plasma arc cutting system to be desensitized to elevation changes of the fluid selection console and can help to ensure consistent and high quality cuts, for example, as used in connection with the systems shown and described herein.

While the invention has been particularly shown and described with reference to specific preferred embodiments, it should be understood by those skilled in the art that various changes in form and detail may be made therein without departing from the spirit and scope of the invention as defined by the following claims.

What is claimed is:

1. A liquid-injection shield for a plasma torch, the shield comprising:
    a body having an exterior surface and an interior surface; and
    a liquid injection regulation component circumferentially disposed within and in direct contact with the interior surface of the body, the liquid injection regulation component and the interior surface of the body defining a chamber,
    the liquid injection regulation component defining a first set of ports, included within the liquid regulation component and sized to regulate a liquid entering the chamber and defining a second set of ports, included within the liquid injection regulation component and oriented to distribute a fluid exiting the chamber, and
    wherein a total cross-sectional flow area of the first set of ports is less than a total cross-sectional flow area of the second set of ports.

2. The shield of claim 1 wherein the ports are oriented to impart a swirl to the fluid exiting the chamber.

3. The shield of claim 1 wherein the liquid injection regulation component comprises an insulator material.

4. The shield of claim 1 wherein each of the ports in the first set of ports is smaller than each of the ports in the second set of ports.

5. The shield of claim 1 wherein the first set of ports is aligned with the chamber in the interior surface of the body.

6. The shield of claim 1 wherein the first set of ports is configured to allow a range of fluid flow rates from about 2 gallons per hour to about 8 gallons per hour of the liquid entering the chamber while maintaining a comparably uniform fluid flow pressure of liquid exiting the chamber.

7. The shield of claim 1 wherein the first set of ports is configured to reduce a fluid pressure by approximately 25 psi for a system having a fluid set pressure of approximately 30 psi or greater.

8. The shield of claim 1 wherein the liquid injection regulation component is molded.

9. The shield of claim 1 wherein the liquid injection regulation component is L-shaped.

10. The shield of claim 1 wherein the first set of ports is oriented at a right angle to the second set of ports.

11. The shield of claim 1 wherein the chamber is configured to atomize or create a fine mist using liquid entering the chamber.

12. The shield of claim 1 wherein the fluid exiting the chamber is a gas, water, or a water mist.

13. The shield of claim 1 wherein the liquid injection regulation component includes two separate sub-components, the first sub-component having the first set of ports and the second sub-component having the second set of ports.

14. A method of regulating a liquid injection process in a plasma arc torch shield, the method comprising:
    providing a shield having an exit orifice, an interior surface, and an exterior surface configured to be exposed to molten spatter;
    supplying a liquid to the interior surface of the shield;
    directing the liquid through a set of metering holes, included within a liquid regulation component in contact with the interior surface of the shield, into a chamber, wherein the metering holes induce a pressure drop of the liquid; and
    directing the liquid out of the chamber through a set of swirl holes included within the liquid regulation component toward an exit orifice,
    wherein a total cross-sectional flow area of the metering holes is less than a total cross-sectional flow area of the swirl holes.

15. The method of claim 14 wherein each of the holes in the set of metering holes is smaller than each of the holes in the set of swirl holes.

16. The method of claim 14 wherein the metering holes are configured to allow a range of fluid flow rates from about 2 gallons per hour to about 8 gallons per hour of the liquid entering the chamber while maintaining a comparably uniform fluid flow pressure of liquid exiting the chamber.

17. The method of claim 14 wherein the metering holes are configured to reduce a fluid flow pressure by approximately 25 psi for a system having a fluid set pressure of approximately 30 psi or greater.

18. The method of claim 14 wherein the liquid is directed through the set of metering holes at a right angle to a path of the liquid through the swirl holes.

19. The method of claim 14 wherein the chamber is configured to atomize or create a fine mist using liquid entering the chamber.

20. A shield for a plasma arc torch, comprising:
 a body having an exterior surface and an interior surface, the interior surface defining a first recess; and
 a unitary fluid regulation component defining a second recess, the fluid regulation component disposed circumferentially within the interior surface of the body,
 wherein the first recess of the body and the second recess of the fluid regulation component define a hollow region having entrance holes and exit holes,
 wherein the entrance holes are configured to regulate a liquid entering the cavity and the exit holes are configured to impart a swirl to liquid exiting the cavity, and
 wherein the entrance holes are oriented at a right angle to the exit holes such that a cross-section of the fluid regulation component forms an L-shape, and
 wherein a total cross-sectional flow area of the entrance holes is less than a total cross-sectional flow area of the exit holes.

21. The shield of claim 20 wherein the entrance holes are oriented at a right angle to the exit holes.

* * * * *

UNITED STATES PATENT AND TRADEMARK OFFICE
CERTIFICATE OF CORRECTION

PATENT NO. : 9,900,972 B2  
APPLICATION NO. : 15/228702  
DATED : February 20, 2018  
INVENTOR(S) : Mitra et al.

It is certified that error appears in the above-identified patent and that said Letters Patent is hereby corrected as shown below:

Page 2, Column 1, Lines 1-2, in the related application section, please delete priority application number "62/209,913" and insert --62/200,913--

Signed and Sealed this  
Seventeenth Day of April, 2018

Andrei Iancu  
*Director of the United States Patent and Trademark Office*